US010115381B2

(12) United States Patent
Zanetti

(10) Patent No.: US 10,115,381 B2
(45) Date of Patent: Oct. 30, 2018

(54) DEVICE AND METHOD FOR SIMULATING A SOUND TIMBRE, PARTICULARLY FOR STRINGED ELECTRICAL MUSICAL INSTRUMENTS

(71) Applicant: Filippo Zanetti, Forli' (IT)

(72) Inventor: Filippo Zanetti, Forli' (IT)

(73) Assignee: Filippo Zanetti, Forli' (IT)

( * ) Notice: Subject to any disclaimer, the term of this patent is extended or adjusted under 35 U.S.C. 154(b) by 0 days.

(21) Appl. No.: 15/566,356

(22) PCT Filed: Apr. 13, 2016

(86) PCT No.: PCT/IB2016/052098
§ 371 (c)(1),
(2) Date: Oct. 13, 2017

(87) PCT Pub. No.: WO2016/166675
PCT Pub. Date: Oct. 20, 2016

(65) Prior Publication Data

US 2018/0122347 A1 May 3, 2018

(30) Foreign Application Priority Data

Apr. 13, 2015 (IT) .............................. M02015A0080

(51) Int. Cl.
*G01P 3/00* (2006.01)
*G10H 1/12* (2006.01)
(Continued)

(52) U.S. Cl.
CPC ........... *G10H 1/125* (2013.01); *G10H 1/0091* (2013.01); *G10H 3/186* (2013.01)

(58) Field of Classification Search
CPC ....... G10H 1/125; G10H 1/0091; G10H 3/186
(Continued)

(56) References Cited

U.S. PATENT DOCUMENTS 5,367,120 A * 11/1994 Hoshiai .................. G10H 1/125 84/616
6,259,015 B1 * 7/2001 Takahashi ............ G10H 1/0041 84/601
(Continued)

FOREIGN PATENT DOCUMENTS

EP 2 372 692 A2 10/2011

OTHER PUBLICATIONS

International Search Report and Written Opinion issued in Italian Patent Application No. IT M020150080 dated Oct. 15, 2015.

*Primary Examiner* — Jeffrey Donels
(74) *Attorney, Agent, or Firm* — Scully, Scott, Murphy & Presser, P.C.

(57) ABSTRACT

A device for simulating a sound timbre, particularly for stringed electrical musical instruments, which comprises input elements for acquiring an electrical signal generated by a musical instrument, and filtering elements which operate on the electrical signal generated by a source musical instrument. The filtering elements apply to the electrical signal generated by the source musical instrument a transfer function obtained by correlating the sound profile of a target musical instrument to the sound profile of the source musical instrument, the sound profiles comprising respectively the average frequency spectrum of a range of notes played on the target musical instrument and the average frequency spectrum of a corresponding range of notes played on the source musical instrument. The sound profiles are defined on the basis of the electrical signals generated by the musical instruments, corresponding to the playing of at least one note per string.

19 Claims, 7 Drawing Sheets

(51) Int. Cl.
*G10H 1/00* (2006.01)
*G10H 3/18* (2006.01)

(58) Field of Classification Search
USPC .......................................................... 84/626
See application file for complete search history.

(56) References Cited

U.S. PATENT DOCUMENTS

| | | | | |
|---|---|---|---|---|
| 6,448,488 | B1 * | 9/2002 | Ekhaus | G10H 1/125 84/622 |
| 6,787,690 | B1 * | 9/2004 | Celi | G10H 1/125 84/600 |
| 8,842,847 | B2 * | 9/2014 | Geisler | G10H 1/06 381/118 |
| 8,847,058 | B2 * | 9/2014 | Shinoda | G10H 1/125 84/623 |
| 9,626,949 | B2 * | 4/2017 | Wang | G10H 7/002 |
| 9,640,162 | B2 * | 5/2017 | Ball | G10H 1/18 |
| 2005/0045027 | A1 * | 3/2005 | Celi | G10H 1/053 84/723 |
| 2007/0168063 | A1 * | 7/2007 | Gallien | G10H 1/125 700/94 |
| 2007/0227344 | A1 * | 10/2007 | Ryle | G10H 1/053 84/723 |
| 2009/0173218 | A1 * | 7/2009 | Kuroki | G10H 3/186 84/629 |
| 2011/0064244 | A1 | 3/2011 | Eisenberg et al. | |
| 2013/0145922 | A1 * | 6/2013 | Shinoda | G10H 1/125 84/604 |
| 2014/0260906 | A1 * | 9/2014 | Welch | G10H 3/182 84/603 |
| 2014/0270215 | A1 * | 9/2014 | Lin | G10H 1/0091 381/61 |

* cited by examiner

DEVICE AND METHOD FOR SIMULATING A SOUND TIMBRE, PARTICULARLY FOR STRINGED ELECTRICAL MUSICAL INSTRUMENTS

BACKGROUND OF THE DISCLOSURE

The present invention relates to a device and to a method for simulating a sound timbre of a stringed musical instrument. In particular, although not exclusively, the present invention relates to the simulation of a sound timbre belonging to a first electrical stringed musical instrument through the use of a second electrical stringed musical instrument.

Timbre is one of the acoustic-perceptive qualities of a sound, and specifically it is the quality that enables a listener to distinguish that sound from another. Two sounds that are formally identical in terms of tonal pitch, intensity and duration, can in fact be perceived with different timbre when they are emitted by different sound sources.

In musical acoustics, each instrument has its own timbre: the same note played on a violin or on a clarinet can be distinguished immediately. The difference, in acoustic terms, is given by the wave form, which is the resultant of the sum of all the components of the complex signal. A different composition of the signal determines the perception of a different timbre.

Pitches, intensities and durations are qualities of the sound that can be quantified and ordered along a scale, in that they are objective physical values that can be measured respectively with frequency meters, chronometers and sound-level meters. By contrast, the timbre cannot be either quantified or measured, since it is a multidimensional value.

In terms of physics, timbre is explained by the fact that a sound, produced in any way, is never pure, i.e. it can never be represented with a sine curve, but it is instead made up of multiple vibrations called harmonics. In other words a note emitted by a musical instrument has a fundamental frequency, but several others are added to this. Methods are known that make it possible to identify which other frequencies, in addition to the fundamental frequency, make up a note played on a certain instrument. These methods identify the "spectrum" of a note, i.e. the frequency distribution of the sounds of that note.

The presence of harmonics in the spectrum of a note makes it possible to distinguish one instrument from another, or to recognize a same note played in different positions on a same instrument. For example, on a guitar a B played on the free string is perceived differently to a B played on the third string.

Nowadays various techniques and technologies are known which can be used to modify the sound timbre of an electrical musical instrument of the stringed type or even of another type.

Such known technologies are usually implemented inside devices that are commonly used in combination with an electrical stringed musical instrument, such as for example amplifiers or pedal boards, or they are implemented directly in the electrical stringed musical instrument, be it a guitar, a bass guitar or a bowed instrument such as a violin.

With particular reference to electric guitars, these known devices generally use the functionality offered by a hexaphonic guitar pickup, located at the bridge of the guitar in addition to the monophonic pickups. Note that hexaphonic pickups are located at the bridge of the guitar because they start from a sound that is rich in harmonics, i.e. from a standard reference sound.

Devices are known for modifying the sound timbre of an electrical musical instrument, which are adapted to mathematically model the distance of the pickups, whether they are monophonic or hexaphonic, from the bridge of the instrument, such modeling taking place in the time domain, in particular by acting on delays.

However, such type of known devices is based on a rather limiting assumption, i.e. that the sound timbre of a musical instrument depends exclusively on the position of the hexaphonic pickup.

Further devices are known for modifying the sound timbre of an electrical musical instrument which complement the mathematical modeling by also analyzing the distance from the strings and from the microphone, in addition to the previously-mentioned distance of the pickups, both monophonic and hexaphonic, from the bridge of the instrument.

Finally, further devices are known for modifying the sound timbre of an electrical musical instrument which, in addition to mathematically modeling the distance of the pickups, both monophonic and hexaphonic, from the bridge of the instrument, and optionally the distance from the strings and from the microphone, apply DSP (Digital Signal Processing) solutions which are integrated in the electrical stringed musical instrument proper.

All these known devices make it possible, starting from the vibration of the strings of a stringed instrument, in particular of an electric guitar, to process the signal induced by that vibration in order to make it audible using an amplifier or a loudspeaker.

The variety of stringed musical instruments known today is such that, in particular among music amateurs and experts, one type of musical instrument can be immediately distinguished from another. For example, a Fender Stratocaster guitar, used to play a song, will give a different result from a Gibson Les Paul.

Usually, the sound timbre is influenced by a plurality of factors. A first factor is constituted for example by the characteristics of the musical instrument played, such as the shape of the harmonic body, the type of wood, the type of pickup used, for example single coil or humbucking, and the position of the pickup, for example in the bridge or in the neck. A second factor is determined by the characteristics of the strings used, which differ in terms of quality, thickness, and state of wear. Other factors are ascribable to the adjustment of the tone and volume knobs, or to the player's technique, which can vary for example according to the shape and thickness of the plectrum, the intensity of the picking, the use of pizzicato techniques with the fingernails or with the fingertips, use of an e-bow, and so on.

EPA 2,372,692 describes a technology for imparting the resonance effect of an acoustic stringed musical instrument to an amplified audio signal, acoustic resonance being a typical characteristic of the acquisition or registration of sound by way of a microphone.

The aim of the present invention is to overcome the above mentioned drawbacks of the known art, by devising a device and a method for simulating a sound timbre, particularly for stringed electrical musical instruments, which make it possible to obtain effects similar to the effects that can be obtained with known solutions, by making it possible to modify the sound timbre of a first electrical stringed musical instrument, herein referred to as the source instrument, until it is made wholly identical to the sound timbre of a second stringed musical instrument, herein referred to as the target instrument.

BRIEF SUMMARY OF THE DISCLOSURE

Within this aim, an object of the present invention is to devise a device and a method for simulating a sound timbre which allow the use of any model of stringed musical instrument, for example any model of electric guitar, to simulate the musical timbre of another model of stringed musical instrument of the same type and, within certain limits, even of another type.

Another object of the present invention is to devise a device and a method for simulating a sound timbre which do not require a hexaphonic pickup, or even a dedicated stringed musical instrument, with consequent advantages in terms of economic savings (the purchase is avoided of an additional component, or of a new instrument) and time savings (for example for assembly), and thus avoiding having to provide an adapted electric power supply, for example by way of a battery, for the electronic components inside the electrical stringed musical instrument.

Another object of the present invention is to devise a device and a method for simulating a sound timbre which make it possible to calculate for each pair of stringed electrical musical instruments, for example for each pair constituted by a source electric guitar and a target electric guitar, the modifications to apply to the electrical signal of the first (source) stringed musical instrument in order to obtain the same sound timbre as the second (target) stringed musical instrument.

Another object of the present invention is to devise a device and a method for simulating a sound timbre which make it possible to simulate, in addition to the sound timbre of a target electrical stringed musical instrument, the technique of the player who is playing the instrument as well, so that, for example, for the same technique, a simulation can be performed between different instruments, each one characterized by determined strings and tone/volume settings, or, if playing the same instrument, one can simulate a sound timbre deriving from different tone and/or volume settings, or a sound timbre deriving from different playing techniques, for example using a rounded or pointed plectrum, or using pizzicato with the fingernails instead of with the fingertips.

Another object of the present invention is to devise a device and a method for simulating a sound timbre which do not have any mathematical model for the identification and consequent processing of the position of the pickup of the electrical stringed musical instrument, be they of the monophonic type or of the hexaphonic type.

Another object of the present invention is to devise a device and a method for simulating a sound timbre which make it possible to use a monophonic pickup, thus ensuring a greater resonance effect between the strings of the musical instrument and a greater sensitivity to touch.

Another object of the present invention is to provide a device and a method for simulating a sound timbre which are highly reliable, easily and practically implemented and low cost.

This aim and these and other objects which will become better apparent hereinafter are achieved by a device for simulating a sound timbre, particularly for stringed electrical musical instruments, which comprises means for acquiring an input electrical signal generated by the vibrations of the strings of a musical instrument, and filtering means which operate on said electrical signal generated by a source musical instrument, characterized in that said filtering means apply to said electrical signal generated by said source musical instrument a transfer function obtained by correlating the sound profile of a target musical instrument to the sound profile of said source musical instrument, said sound profiles comprising respectively the average frequency spectrum of a range of notes played on said target musical instrument and the average frequency spectrum of a corresponding range of notes played on said source musical instrument, and said sound profiles being defined on the basis of said electrical signals generated by said musical instruments, corresponding to the playing of at least one note per string, covering at least one tenth of the range of extension of said musical instruments.

The aim and objects are also achieved by a method for simulating a sound timbre, particularly for stringed electrical musical instruments, characterized in that it comprises the steps that consist of: acquiring an input electrical signal generated by the vibrations of the strings of a source musical instrument; obtaining a transfer function by correlating the sound profile of a target musical instrument to the sound profile of said source musical instrument, said sound profiles comprising respectively the average frequency spectrum of a range of notes played on said target musical instrument and the average frequency spectrum of a corresponding range of notes played on said source musical instrument; and filtering said electrical signal generated by said source musical instrument, applying said transfer function to said electrical signal.

The term "sound profile" means a set of characteristics related to the harmonic content and amplitude envelope of a sound, which determine its particular timbre.

In a preferred embodiment of the device and of the method for simulating a sound timbre according to the invention, the above mentioned average frequency spectrum is obtained by way of calculating the average value of the spectral envelopes for sounds of different pitch.

The aim and objects are further achieved by a device for simulating a sound timbre, particularly for stringed electrical musical instruments, according to the other appended independent claims.

Further characteristics and advantages of the invention will become better apparent from the detailed description of a preferred, but not exclusive, embodiment of the device for simulating a sound timbre, particularly for stringed electrical musical instruments, according to the invention, which is illustrated by way of non-limiting example in the accompanying drawings wherein:

DETAILED DESCRIPTION OF THE DISCLOSURE

Figure 1:
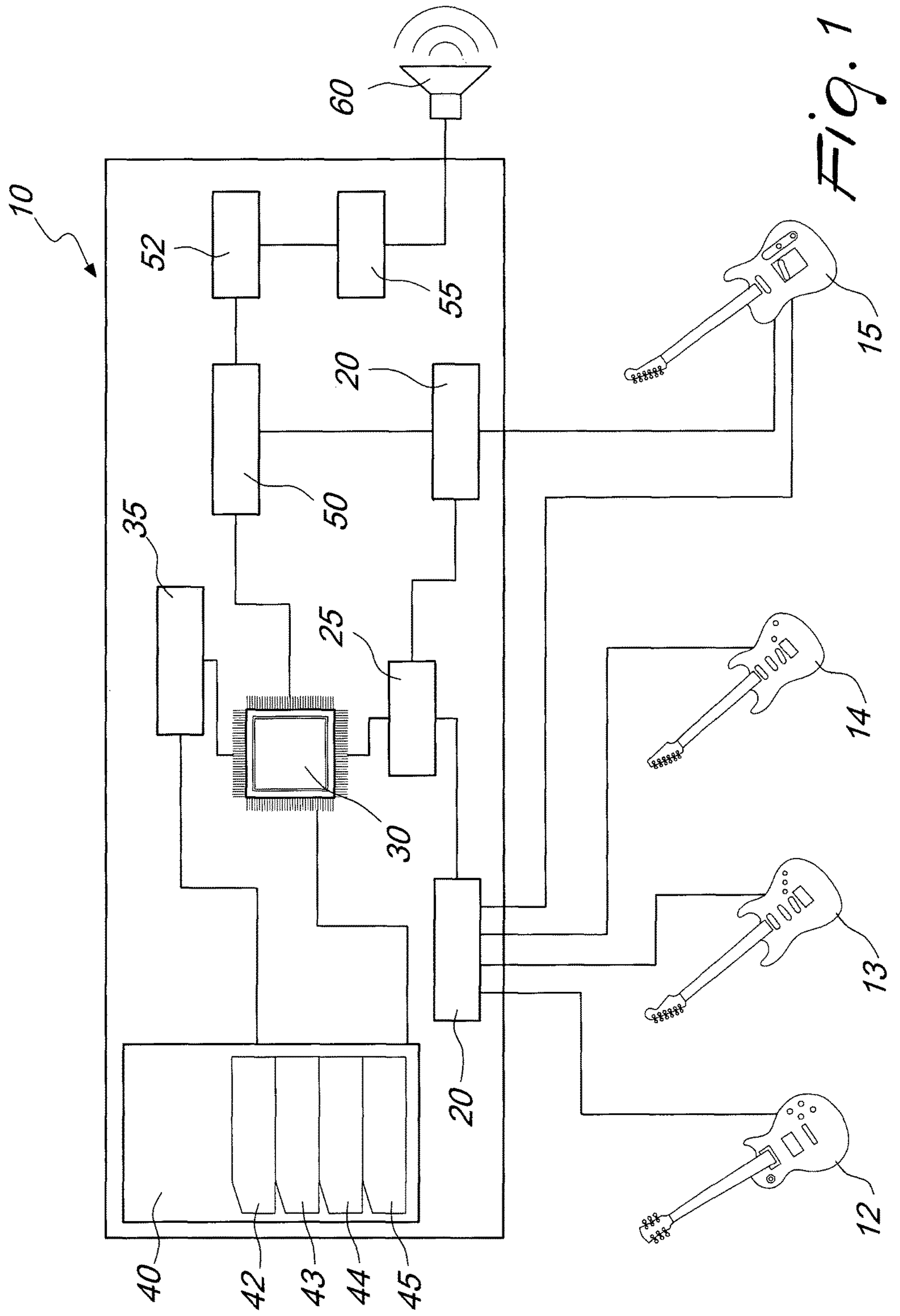
FIG. 1 is a block diagram showing a possible embodiment of the device for simulating a sound timbre, particularly for stringed electrical musical instruments, according to the present invention.
Figure 3:
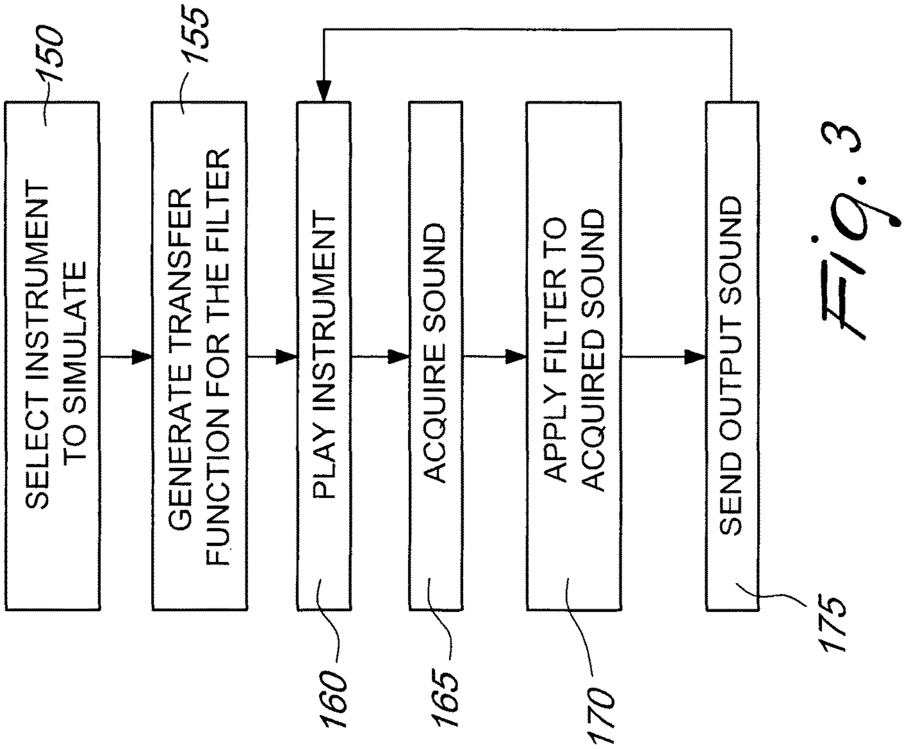
FIG. 3 is a flowchart showing the operation of a possible embodiment of the device for simulating a sound timbre, according to the present invention, shown in FIG. 1, in particular with regard to the playing procedure.
Figure 2:
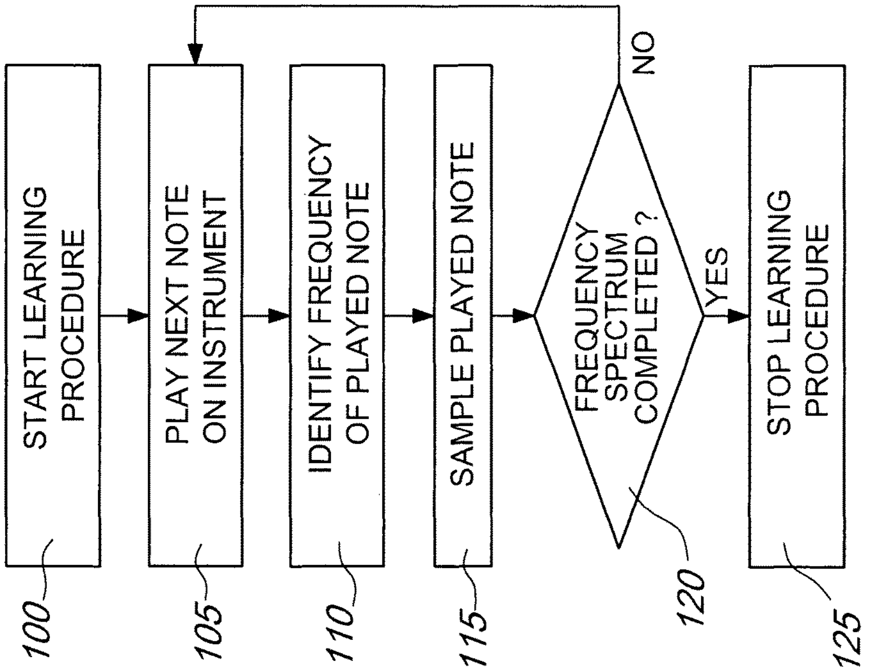
FIG. 2 is a flowchart showing the operation of a possible embodiment of the device for simulating a sound timbre, according to the present invention, in particular with regard to the learning procedure.

With reference to the figures, the device for simulating a sound timbre, particularly for stringed electrical musical instruments, according to the invention, generally designated by the reference numeral 10, substantially comprises means 20 for acquiring a first, input electrical signal, an analog-to-digital converter 25, processing means 30, a memory 40 for storing sound profiles 42, 43, 44 or 45, a selector or selection means 35 for selecting a sound profile, filtering means 50, amplitude modulation means 52, and means 55 for producing a second, output electrical signal.

By way of non-limiting example, hereinafter in the present description, for greater clarity, the example that will be given of the device 10 for simulating a sound timbre, particularly for stringed electrical musical instruments, will be specifically electric guitars.

The input means 20 acquire an analog electrical signal originating, by way of a connection cable, from an electric guitar 12, 13, 14 or 15 played by a user, such analog electrical signal being generated in particular by the pickups of the electric guitar, for example by a polyphonic pickup.

Alternatively, the input means 20 can acquire an analog electrical signal generated by a microphone, which captures the audio emitted by acoustic stringed musical instruments, such as in particular acoustic guitars.

The electrical signal generated by an electric guitar 12, 13, 14 or 15 and acquired by the input means 20 is subsequently sent to the analog-to-digital converter 25, which is an electronic circuit capable of converting an analog electrical signal with continuous progression, specifically a voltage, to a series of discrete values.

Following the analog-to-digital conversion, the processing means 30, typically constituted by a processor or CPU, process the electrical which is now digital, thus defining a sound profile 42, 43, 44 or 45 that corresponds to the electric guitar 12, 13, 14 or 15 from which the electrical signal originated.

Each one of the sound profiles 42, 43, 44 or 45, in particular, comprises the spectrum, i.e. the frequency distribution, of the electrical signal originating from the electric guitar 12, 13, 14 or 15, and such spectrum identifies the sound timbre corresponding to a specific electric guitar 12, 13, 14 or 15.

In an embodiment of the invention, the sound profiles 42, 43, 44 or 45 corresponding to the electric guitars 12, 13, 14 or 15 further comprise characteristics of the model of musical instrument and/or of the configuration of use of the musical instrument.

These characteristics can comprise the model of stringed musical instrument, the type and/or the position of the pickup (for example single coil pickup at the bridge), the type and/or the scaling of the strings, the position of the volume/tone potentiometer, and the playing technique (for example with a plectrum or using pizzicato).

After the definition of the corresponding sound profile by the processing means 30, this sound profile is saved in an adapted memory 40, for example an EEPROM, for storing the sound profiles 42, 43, 44 or 45.

By way of the components described above, i.e. the input means 20, the analog-to-digital converter 25, the processing means 30 and the memory 40, the device 10 for simulating a sound timbre according to the invention is capable of executing a "learning" procedure, in order to define and store a certain number of sound profiles 42, 43, 44 or 45, each one corresponding to a different electric guitar 12, 13, 14 or 15.

In an alternative embodiment of the device 10 for simulating a sound timbre, the sound profile 42, 43, 44 or 45 is not defined by the processing means 30 comprised in the device 10 proper, but is defined by a remote computer of the server type which is connected, for example through a telematic communications network like the Internet, to the device 10 and to which the processing means 30 delegate the processing.

In practice, the user plays at least one note for each string, for example on the electric guitar 12, covering a significant portion of the range of extension of the instrument, and the device 10 for simulating a sound timbre acquires and converts the electrical signal generated by the electric guitar 12 being played and, on the basis of such electrical signal, it defines and stores a sound profile 42 that corresponds to the electric guitar 12.

The various notes produced by the user's playing can be emitted individually, i.e. one at a time, or they can be emitted simultaneously, i.e. two or more at a time, such as for example bichords, trichords and so on, or chord sounds in general. Note, however, that better sound profiles can be obtained by starting from individual notes or sounds.

The best result is obviously obtained by comprising the entire range of extension of the instrument, but it is also possible to cover a smaller range. For example, it has been found that in economic embodiments and using components with medium or low performance in terms of memory available and processor speed, it is in any case sufficient to cover at least one tenth of the overall range, in order to obtain results that are in any case appreciable.

The same applies to the electric guitar 13, or rather to the electrical signal generated thereby, for which the device 10 defines and stores a corresponding sound profile 43, and so on for all the remaining electric guitars 14, 15 for which the user wishes to define and store a corresponding sound profile 44, 45.

Usually, the learning procedure weighs the contribution of the different strings equally for the calculation of the average frequency spectrum comprised in the sound profiles 42, 43, 44 and 45 of the electric guitars 12, 13, 14 and 15, even if the number of notes played is not the same for each string.

In a preferred embodiment of the invention, in the above mentioned learning procedure, the user plays the same number of notes for each string. Therefore, in this case, the sound profiles 42, 43, 44 and 45 are defined by playing the same number of notes for each string.

In an even more preferred embodiment of the invention, again in the above mentioned learning procedure, the user plays notes that belong to a chromatic scale. Therefore, in this case, the sound profiles 42, 43, 44 and 45 are defined by playing notes that belong to a chromatic scale.

In a preferred embodiment of the invention, again in the above mentioned learning procedure, the user plays the same sequence of notes, typically a preset sequence, with all the different electric guitars 12, 13, 14 and 15, so that all the corresponding sound profiles 42, 43, 44 and 45 are defined on the basis of the same sequence of notes. In practice, this way the sound profile of a source electric guitar and the sound profile of a target electric guitar will be defined on the basis of the same sequence of notes.

In a preferred embodiment of the device 10 for simulating a sound timbre, the respective spectra of the above mentioned sound profiles 42, 43, 44 or 45 corresponding to the above mentioned electric guitars 12, 13, 14 or 15, are defined according to the following method.

First of all one records sounds (electrical signals) of an electric guitar 12, 13, 14 or 15 with predefined sample size and sampling frequency, which are larger the greater the quality desired, the more powerful the processor used and the more memory available for storing the data. In particular, the recording occurs preferably using samples of at least 16 bits recorded with a frequency of at least 10 kHz, playing at least one note per string for N notes in total, preferably playing the same number of notes for each string and covering the entire range of extension of the instrument.

The sounds, i.e. the respective electrical signals, corresponding to the N notes played, are then normalized with reference to a maximum amplitude set to 1.

Figure 4:
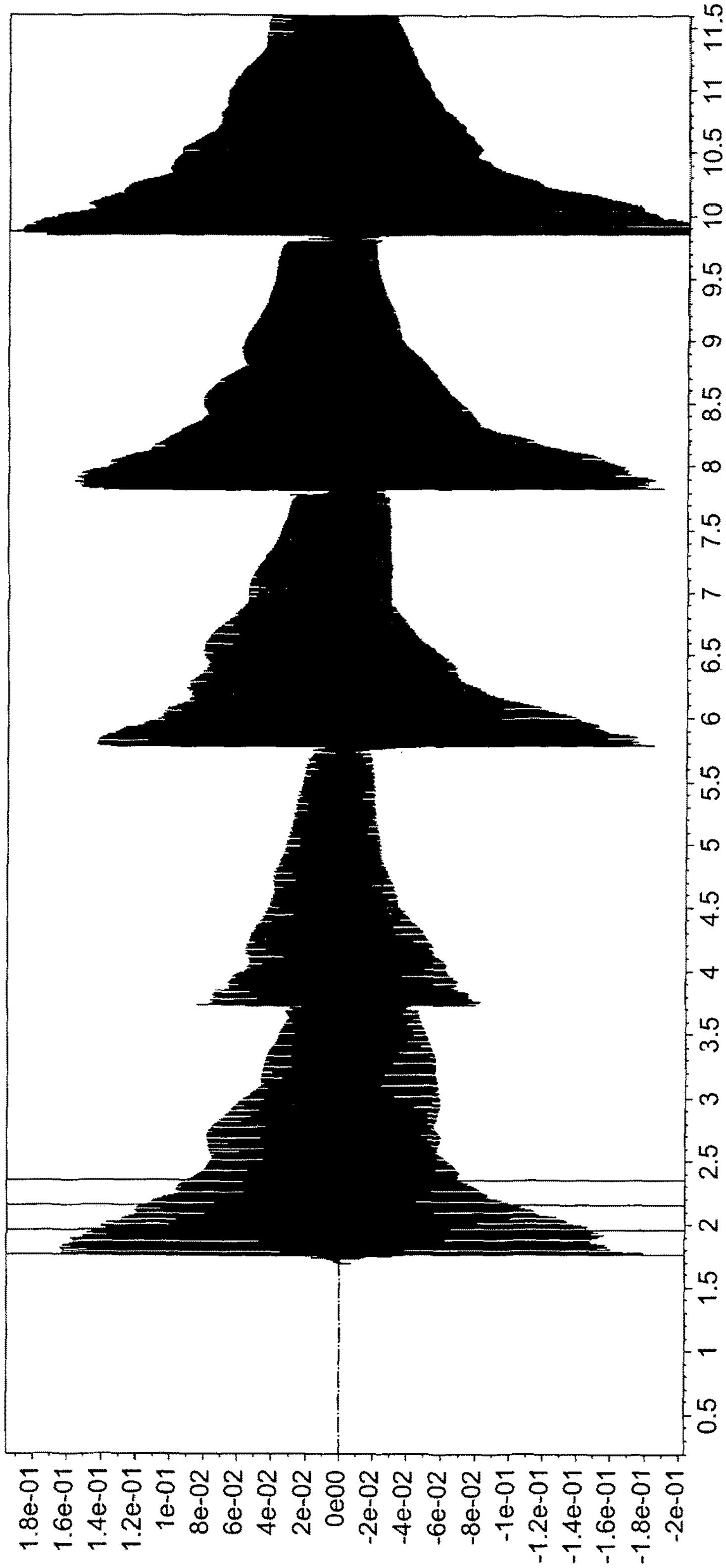
FIG. 4 is a graph showing the progression over time of the electrical signal generated by a stringed musical instrument, in particular by an electric guitar.

The progression over time of each sound of a note, i.e. of each electrical signal, recorded and normalized, is analyzed, preferably at regular intervals, within a limited time slot that contains the maximum amplitude peak, for example every 0.1 tenth of a second for a number n times, with Z varying from 1 to n, and starting from the moment the sound began (see FIG. 4), carrying out the following steps for each sound:

- application of a fast Fourier transform on a time slot of the signal which is long enough to ensure an effective resolution of the frequencies;
- identification of the peaks for each multiple of the fundamental frequency, up to a maximum frequency Fmax, beyond which only the noise of acquisition can be encountered;
- calculation of the average value of the identified peaks for each multiple of the fundamental frequency, with Z varying from 1 to n.

At this point, as above, the averages are calculated of the peaks for the various sounds, i.e. at the various frequencies, and then a linear interpolation, or an interpolation using a spline function, is performed on such averages, preferably weighing the contribution of the different strings equally, thus obtaining the complete spectrum of the instrument, and finally this is filtered in order to obtain a characteristic "smooth" spectrum.

Note that a spline is a function, constituted by a set of mutually connected polynomials, the purpose of which is to interpolate in a range a set of points (called nodes of the spline), so that the function is continuous at least up to a given order of derivatives at every point in the range.

In alternative embodiments of the device 10 for simulating a sound timbre, the respective spectra of the above mentioned sound profiles 42, 43, 44 or 45 corresponding to the above mentioned electric guitars 12, 13, 14 or 15, are defined according to other methods, such as for example estimating the spectrum of the electrical signal by way of cepstrum, mel-cepstrum, or LPC.

Once the user has played all the electric guitars 12, 13, 14 and 15 that are of interest, thus enabling the device 10 for simulating a sound timbre to learn, i.e. define and store, the corresponding sound profiles 42, 43, 44, 45, it is possible to implement a playing procedure, in order to play the (source) electric guitar 15 but now simulating the sound timbre of, for example, the sound profile 43 that corresponds to the (target) electric guitar 13.

In such case, the user must first select the sound profile 43 of the electric guitar 13 (target), i.e. the sound profile that corresponds to the electric guitar whose sound timbre and texture the user wants to simulate.

Such selection of the sound profile 43 desired occurs by way of a selector 35, which is comprised in the device 10 for simulating a sound timbre and is constituted, for example, by a switch or by a knob, if the interface is mechanical, or by a graphic element, for example a graphic button or an icon, if the interface is electronic, for example a touch screen, or a computer program.

Similarly to what is described above for the learning procedure, the input means 20 acquire an analog electrical signal originating, by way of an adapted connection cable, from the electric guitar 15 being played by the user.

Also, the electrical signal generated by the electric guitar 15 and acquired by the input means 20 is subsequently sent to the analog-to-digital converter 25 and converted thereby to a series of discrete values.

Following the analog-to-digital conversion, the processing means 30, which as mentioned are typically constituted by a CPU, process the electrical signal, which is now digital, identifying the corresponding sound profile 45 that corresponds to the electric guitar 15, which was previously learned, i.e. defined and stored, by the device 10.

In an embodiment of the invention, the device 10 for simulating a sound timbre, particularly for stringed electrical musical instruments, is configured to require the user to play a preset sequence of notes, in order to identify the sound profile 45 of the source musical instrument 15. Preferably, the preset sequence of notes to be played, which is requested by the device 10 to the user, is the same sequence used in the learning procedure to define the sound profile 42, 43 or 44 of the target musical instrument 12, 13 or 14. In an embodiment of the invention, the device 10 for simulating a sound timbre is further configured to verify the correct playing by the user of such required preset sequence of notes.

When the processing means 30 of the device 10 have access to the information for the sound profile 45 of the source electric guitar 15, which is currently being played by the user, and to the information for the sound profile 43 of the target electric guitar 13, the sound timbre of which the user wants to simulate, the information for both of the sound profiles 45 and 43 being accessible from the storage memory 40, then the processing means 30 can calculate a transfer function by way of which the device 10 is capable of modifying the electrical signal generated by the electric guitar 15 being played by the user, in order to optimally simulate the sound timbre of the electric guitar 13 although the user is actually playing the electric guitar 15.

In an embodiment of the device 10 for simulating a sound timbre, particularly for stringed electrical musical instruments, the processing means 30 calculate a transfer function for each individual string. In another embodiment of the device 10 for simulating a sound timbre, the processing means 30 calculate a transfer function for a set of strings, for example if a polyphonic pickup is used.

In particular, such transfer function, calculated by the processing means 30, is applied by the device 10 to the electrical signal generated by the electric guitar 15 being played by the user by acting on the filtering means 50.

In a preferred embodiment of the device 10 for simulating a sound timbre, according to the invention, the filtering means 50 comprise an analog circuit, or analog-to-digital circuit, which is adapted to approximate the characteristics of the filter.

In a preferred embodiment of the device 10 for simulating a sound timbre, the above mentioned transfer function, for modifying the electrical signal generated by the source electric guitar, is given by the ratio at the various frequencies among the average characteristic spectral representations of the electrical signals generated by the source and target electric guitars.

Figure 5:
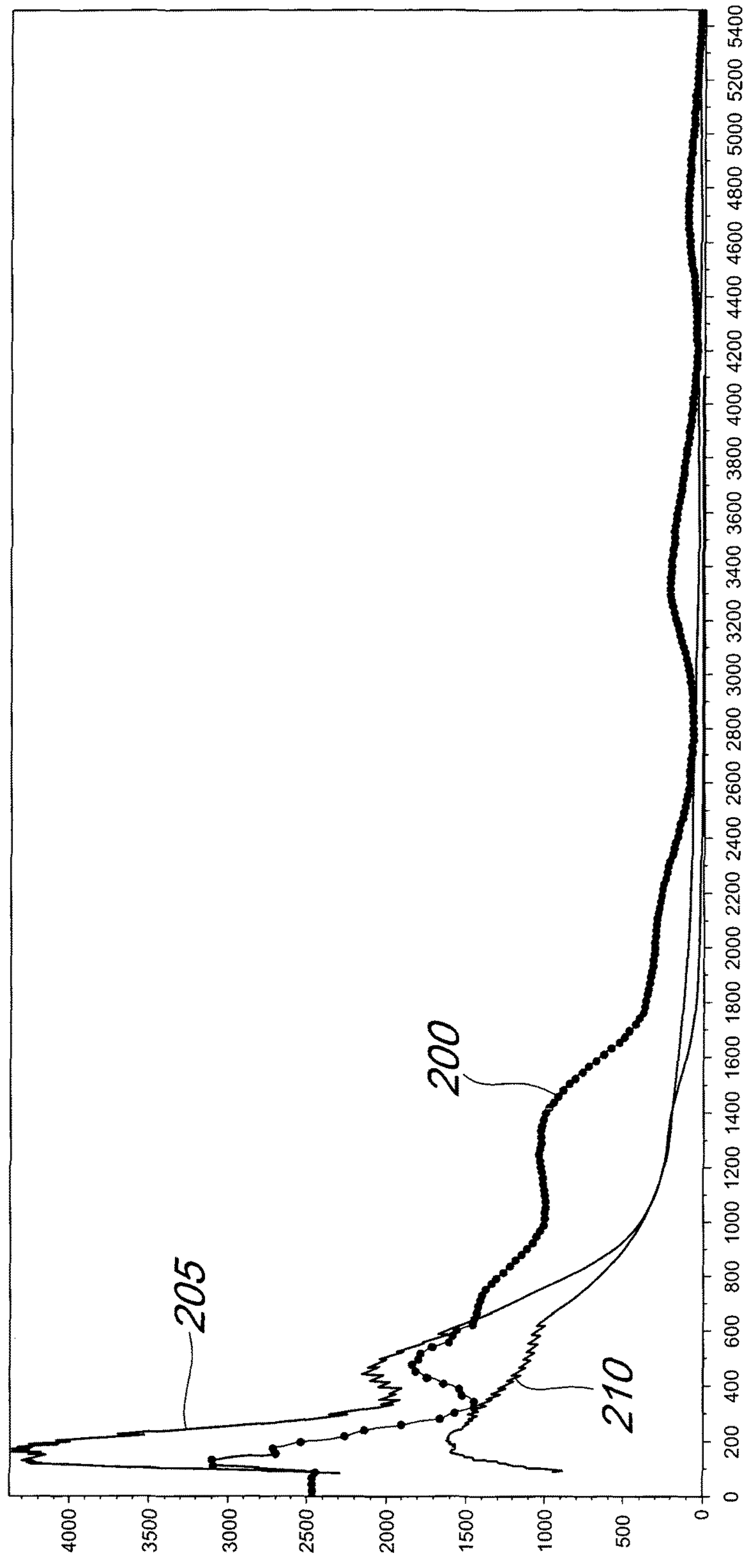
FIG. 5 is a graph showing the spectral representations, i.e. the frequency distributions, of the characteristic electrical signals of a pair of stringed electrical musical instruments, in particular a source electric guitar and a target electric guitar, and the associated transfer function.
Figure 6:
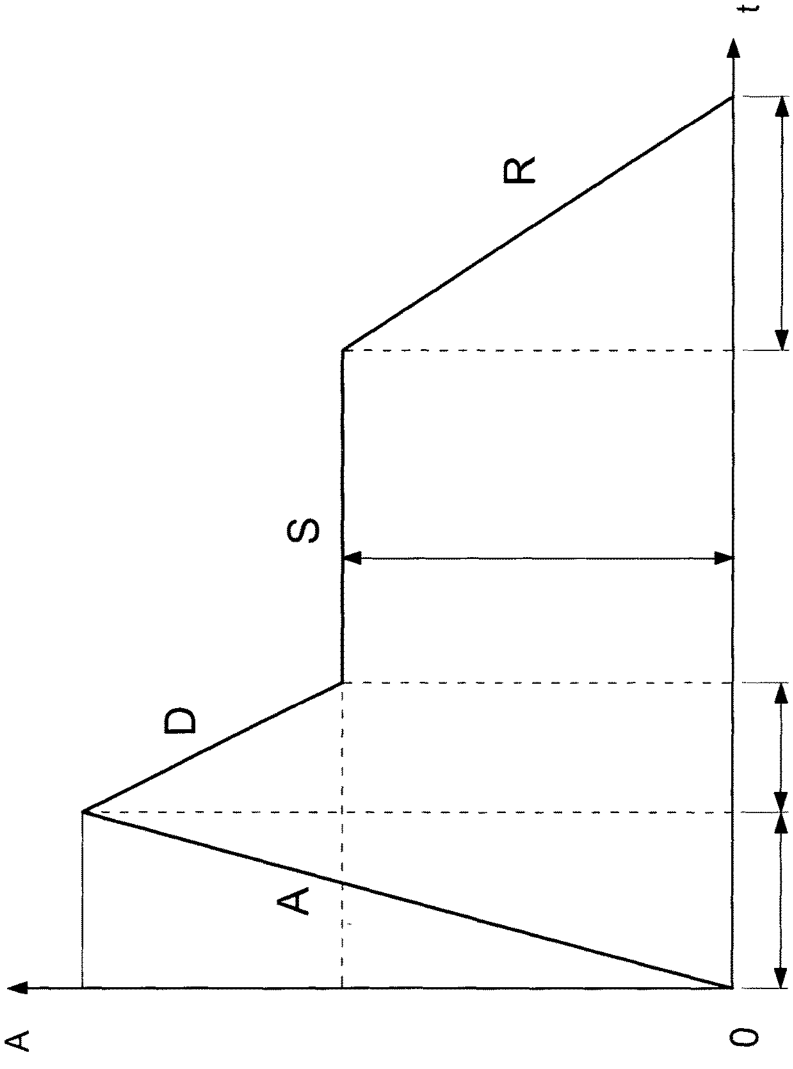
FIG. 6 is a graph showing the progression over time of the four steps that make up the envelope: Attack, Decay, Sustain, Release, commonly grouped in the acronym ADSR.

Taking FIG. 5 as an example, the spectral representations of the transfer function 200 G(ω)=A(ω)/B(ω) is given by the ratio between the average characteristic spectral representation 205 A(ω) of the electrical signal generated by the target electric guitar, i.e. the electric guitar whose sound timbre the user wishes to simulate, and the average characteristic spectral representation 210 B(ω) of the electrical signal generated by the source electric guitar, i.e. the electric guitar that the user intends to actually play.

In an embodiment, the transfer function of the filter 50 is variable as a function of the time, i.e. a different transfer function is applied according to the time t that has elapsed since the moment when the sound began. In particular, in the learning step, the transfer function is not calculated by processing the average value of the identified peaks, with Z varying from 1 to the number of sampling intervals n as previously described; rather, a different transfer function is stored for each sampling moment Z. In this manner, at the time of simulation, it is possible to apply the transfer function for the sample Z that corresponds to the time of execution. The person skilled in the art will understand without effort that it is also possible to determine a number at will of transfer functions, more than 1 and fewer than n, applying, in the step of simulating the sound, the transfer function that comprises the current moment in time. Note also that the subdivision of the transfer functions does not necessarily have to be linear, with mutually identical time intervals. For example, it is possible to store a higher number of transfer functions at the start of the sound or in the central part thereof, and transfer functions that comprise wider intervals in other points of the sampling range.

In an embodiment, in the device 10 for simulating a sound timbre according to the invention, another factor that can be considered is the envelope (ADSR—Attack, Decay, Sustain, Release) of the sounds, in particular where the goal is to simulate the sound timbre of a stringed musical instrument of a different type or family to the type or family of the stringed musical instrument actually being played by the user, for example in order to simulate the sound timbre of an electric bass guitar, of a violin or of a piano by playing an electric guitar, or vice versa.

Furthermore, the envelope of the sounds can also be considered if the goal is to simulate the sound timbre of a non-stringed musical instrument, for example a wind instrument, and therefore evidently an instrument of a different type or family to the type or family of the stringed musical instrument actually being played by the user, for example in order to simulate the sound timbre of a flute, of a clarinet or of a trumpet by playing an electric guitar.

Usually, the fact that the evolution of the envelope over time can be modified makes it possible both to emulate the Sustain of different models of electric guitars, i.e. of stringed musical instruments of the same type or family, and to emulate the sound timbre of musical instruments of different types or families.

In such case, the transfer function, applied to filter the electrical signal generated by the source musical instrument, undergoes further processing before being applied, according to the following method.

First of all the ADSR is determined of the sounds of both of the stringed musical instruments, i.e. of the source instrument and of the target instrument, and the corresponding rADSR ratios between the sounds of the two stringed musical instruments, at the same pitch, are determined, by carrying out the following steps for each sound:

- calculate the ratios between the phases rA, rD, rS, rR of the envelope of the two sounds, for the various pitches;
- calculate the ratios between the maximum amplitude values and the Sustain values between the two sounds;
- optionally calculate the average values on the entire pitch interval.

Subsequently, the amplitude modulation means 52 amplitude modulate the filtered electrical signal, thus modifying the envelope of the sound of the source musical instrument; such amplitude modulating occurs by applying the gains that were calculated previously, in particular on the basis of the time since the Attack of the envelope of the sound of the source stringed musical instrument.

Figure 7:
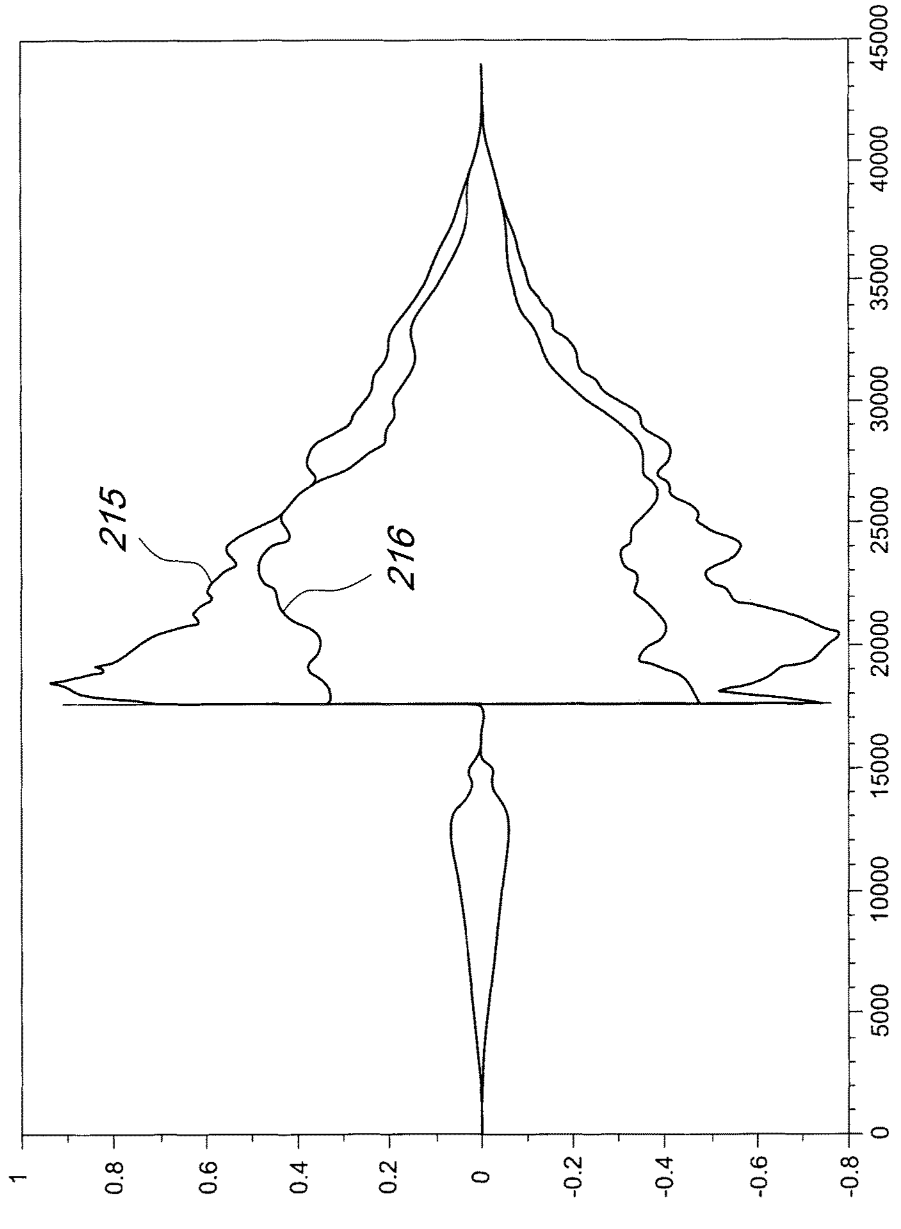
FIG. 7 is a graph showing the amplitude envelopes of a note played with two different playing techniques, for example using a plectrum and using pizzicato.

Similar considerations apply with reference to FIG. 7, which shows the amplitude envelopes of a note played with two different playing techniques, for example using a plectrum and using pizzicato. The same processing technique described above for the ADSR schematic can be applied to the effective amplitude envelopes of each note or of each sound. In particular, it is possible to calculate at each moment the amplitude ratio between the envelope 215 and the envelope 216 and obtain an amplification profile of the sound.

This enables not only a further improvement of the reproduction of the sound of a target instrument, but also the choice of the result in terms of playing mode, even for the same instrument. For example, it is possible to play an instrument using a plectrum but reproduce the sound of the instrument as if it were being played using pizzicato and vice versa, and it is possible to play an instrument using pizzicato but reproduce the sound of another instrument as if this were being played using a plectrum and vice versa.

In an embodiment of the invention, in order to allow the application in real time of the transfer function for modifying the electrical signal generated by the source electric guitar, the filtering means 50 can comprise a FIR filter (Finite Impulse Response), optionally minimum phase.

In an embodiment of the device 10 for simulating a sound timbre, particularly for stringed electrical musical instruments, according to the invention, the filtering means 50 can comprise an IIR filter (Infinite Impulse Response).

In an embodiment of the device 10 for simulating a sound timbre according to the invention, the filtering means 50 can comprise a comb filter.

In an embodiment of the device 10 for simulating a sound timbre according to the invention, the filtering means 50 use the partitioned convolution technique in order to ensure minimal latency time, such partitioned convolution requiring a "smooth" filtering in order to prevent artifacts.

In particular, it has been found that the use of a FIR filter coupled with the use of the partitioned convolution technique ensures the best compromise between sound quality and latency time. It has further been found that the use of an IIR filter in combination with the above mentioned FIR filter enables a better resolution in the filter in the treatment of low frequencies.

In an alternative embodiment of the invention, the transfer function, which makes it possible to modify the sound timbre of the source electric guitar 15 in order to make it identical to the sound timbre of the target electric guitar 13, is not calculated by the processing means 30 comprised in the device 10 proper, but is calculated in advance by a remote computer of the server type which is connected, for example through a telematic communications network like the internet, to the device 10 and to which the processing means 30 delegate the processing.

Substantially, in the above mentioned playing procedure, the user first selects the sound profile 43 of the target electric guitar 13, and then begins to play the source electric guitar 15 freely, or following a suggested method. The device 10 for simulating a sound timbre acquires and converts the electrical signal generated by the electric guitar 15 being played and, on the basis of the sound profile 43 selected earlier, calculates a transfer function to be applied, by way of the filtering means 50, to the electrical signal of the electric guitar 15 being played, in order to optimally simulate the sound timbre of the electric guitar 13.

Finally, the output means 55 receive the electrical signal of the electric guitar 15 being played by the user, duly modified by the passage through the filtering means 50 on the basis of the previously-calculated transfer function, and produce a new electrical signal in output, which is sent for example to amplifiers or loudspeakers 60, such new electrical signal having the same sound timbre as the electric guitar 13.

Operation of the device 10 for simulating a sound timbre, particularly for stringed electrical musical instruments, according to the invention, in particular with regard to the learning procedure, thanks to which the device 10 is capable of defining and storing, for example, the sound profile 42 that corresponds to the electric guitar 12, is the following.

Initially, in step 100, the user activates the learning procedure by acting on the device 10, for example by selecting such procedure by way of an adapted interface or an adapted selector comprised in the device 10. On activating this learning procedure, the device 10 configures its components in order to learn, i.e. in order to define and store, a new sound profile 42 corresponding to the input electrical signal generated by an electric guitar 12, unknown up to now.

In step 105, the user plays a note on the new electric guitar 12, which as a consequence generates a corresponding input electrical signal which arrives at the device 10 by way of the input means 20.

In step 110, the device 10 identifies the frequency of the electrical signal that corresponds to the note that has just been played by the user on the new electric guitar 12 and, in step 115, the device 10 samples, for example according to the technique described above, the same electrical signal that corresponds to the note that has just been played by the user.

Since the principal goal of the learning procedure is to identify the frequency spectrum, i.e. the sound timbre, of the new electric guitar, then associating such spectrum or sound timbre with the new sound profile 42, step 120 checks whether the identification of the spectrum has been completed or not.

If not, the learning procedure returns to step 105, in which the user plays an additional note on the new electric guitar 12, as a consequence producing a corresponding electrical signal. As already anticipated, for an optimal learning, the user must play at least one note per string on the electric guitar 12 until the entire range of extension of the instrument is covered, preferably playing the same number of notes for each string.

Usually, the learning procedure weighs the contribution of the different strings equally for the calculation of the average frequency spectrum comprised in the sound profiles 42, 43, 44 and 45 of the electric guitars 12, 13, 14 and 15, even if the number of notes played is not the same for each string.

In a preferred embodiment of the invention, in the above mentioned learning procedure, the user plays the same number of notes for each string. Therefore, in this case, the sound profiles 42, 43, 44 and 45 are defined by playing the same number of notes for each string.

In an even more preferred embodiment of the invention, again in the above mentioned learning procedure, the user plays notes that belong to a chromatic scale. Therefore, in this case, the sound profiles 42, 43, 44 and 45 are defined by playing notes that belong to a chromatic scale.

In a preferred embodiment of the invention, again in the above mentioned learning procedure, the user plays the same sequence of notes, typically a preset sequence, with all the different electric guitars 12, 13, 14 and 15, so that all the corresponding sound profiles 42, 43, 44 and 45 are defined on the basis of the same sequence of notes. In practice, in this way the sound profile of a source electric guitar and the sound profile of a target electric guitar will be defined on the basis of the same sequence of notes.

If all the notes have been covered, the learning procedure ends in step 125, with the storage in the memory 40 of the device 10 of the new sound profile 42 that corresponds to the new electric guitar 12, such new sound profile 42 comprising, in particular, the spectrum of the electrical signal originating from the new electric guitar 12, such spectrum identifying the sound timbre that corresponds thereto.

Operation of the device 10 for simulating a sound timbre, particularly for stringed electrical musical instruments, according to the invention, in particular with regard to the playing procedure, thanks to which the device 10 is capable of simulating the sound timbre corresponding, for example, to the sound profile 43 that corresponds to the (target) electric guitar 13, although the user is actually playing a different musical instrument such as for example the (source) electric guitar 15, is the following.

Initially, in step 150, the user starts the playing procedure by selecting, by way of the selection means 35, the target electric guitar 13 whose sound timbre the user wishes to simulate, or rather by selecting the sound profile 43, present in the memory 40 of the device 10, corresponding thereto. Upon activating this playing procedure, the device 10 configures its components to modify the input electrical signal generated by a source electric guitar 15.

In step 155, the device 10 according to the invention, and in particular the processing means 30, calculate an appropriate transfer function that is adapted to modify the sound timbre of the source electric guitar 15 until it is made wholly identical to the sound timbre of the selected target electric guitar 13.

Alternatively, such transfer function can be calculated by a remote computer of the server type which is connected, for example through a telematic communications network like the internet, to the device 10 and to which the processing means 30 delegate the processing In an embodiment of the invention, a transfer function is calculated for each individual string. In another embodiment of the invention, a transfer function is calculated for a set of strings, for example if a polyphonic pickup is used.

In step 160, the user plays some notes on the source electric guitar 15, as a consequence producing a corresponding electrical signal, and, in step 165, the device 10 acquires such input electrical signal by way of the input means 20.

Once the electrical signal generated by the source electric guitar 15 is acquired, in step 170 the device 10 applies the above mentioned transfer function to this input signal, through the filtering means 50.

Finally, in step 175 the output means 55 of the device 10 receive the electrical signal of the source electric guitar 15, duly modified by the passage through the filtering means 50 on the basis of the previously-calculated transfer function, and produce a new electrical signal as output, such new electrical signal having the same sound timbre as the target electric guitar 13.

Obviously, following step 175, the playing procedure cyclically returns to step 160, in which the user plays some notes on the source electric guitar 15, until the user interrupts such procedure, by ceasing to play the source electric guitar 15.

In a preferred embodiment of the device 10 for simulating a sound timbre, particularly for stringed electrical musical instruments, operation of the invention is based on the definition, either preset or set using the learning procedure, of at least one reference electric guitar (B), thanks to which it is possible, by playing a source electric guitar (A), to simulate the sound timbre of one of the predefined target electric guitars (C, D, E, F and G).

In an embodiment of the invention, the reference electric guitar (B), or more generally the reference musical instrument, comprises characteristics of the model of musical instrument and/or of the configuration of use of the musical instrument.

These characteristics can comprise the model of stringed musical instrument, the type and/or the position of the pickup (for example single coil pickup at the bridge), the type and/or the scaling of the strings, the position of the volume/tone potentiometer, and the playing technique (for example with a plectrum or using pizzicato).

In this way, for the correct operation of the invention, it is sufficient to calculate solely the spectral transfer function in order to pass from the sound timbre of the source electric guitar A, which is being played by the user, to the sound timbre of the reference electric guitar B, since all the spectral transfer functions are already available, because they are predefined, for passing from the sound timbre of the reference electric guitar B to the sound timbres of the target electric guitars C, D, E, F and G.

| | | |
|---|---|---|
| | | -> C |
| | | -> D |
| A | -> B | -> E |
| | | -> F |
| | | -> G |

For example, in order to simulate the sound timbre of the target electric guitar C by playing the source electric guitar A and being passed through the sound timbre of the reference guitar B (i.e. A->B->C), substantially the following formula is applied:

$$C(\omega)/A(\omega)=C(\omega)/B(\omega)*B(\omega)/A(\omega)$$

In such case, the sound profiles of the target electric guitars C, D, E, F and G are preloaded in the memory 40 of the device 10 for simulating a sound timbre according to the invention and no longer comprise the spectrum, i.e. the frequency distribution, of the electrical signal originating from an electric guitar, and instead they directly comprise the spectral transfer functions for passing from the sound timbre of at least one reference guitar B to the sound timbre of a plurality of target electric guitars C, D, E, F and G (in particular a spectral transfer function for each sound profile corresponding to a target electric guitar).

In an embodiment of the invention, the device 10 for simulating a sound timbre, particularly for stringed electrical musical instruments, is configured to execute morphing, which consists of the fluid, gradual and continuous conversion between two or more different target sound profiles to be simulated, i.e. between two or more different sound timbres or spectra for two or more different target electric guitars.

It must be remembered that, as mentioned previously, the transfer function $G(\omega)=A(\omega)/B(\omega)$ is given by the ratio between the characteristic spectrum $A(\omega)$ of the electrical signal generated by the target electric guitar, i.e. the electric guitar whose sound timbre the user wishes to simulate, and the characteristic spectrum $B(\omega)$ of the electrical signal generated by the source electric guitar, i.e. the electric guitar that the user intends to actually play.

Given that $G_0(\omega)=1$ corresponds to a null conversion, i.e. to a conversion that does not lead to any variation of the sound timbre, i.e. of the spectrum, by applying the formula $G_x(\omega)=1+x*(G(\omega)-1)$, with $x=[0, \ldots, 1]$ which is the conversion coefficient, we get a series of intermediate sound timbres (spectra) which are comprised between the starting sound timbre and the finishing sound timbre.

In the more general case, therefore, the user can play the source electric guitar B and simulate a sound timbre or spectrum that during playing passes from the one that corresponds to the target electric guitar A to the one that corresponds to the target electric guitar C, by modulating the conversion coefficient x.

Note that the conversion coefficient x can be modified dynamically and in real time by the user during playing, for example by way of an expression pedal connected to the device 10 according to the invention, or by way of a knob included in the device 10 according to the invention.

Similarly, in an embodiment of the device 10 for simulating a sound timbre according to the invention, morphing is executed between two or more different target sound profiles to be simulated, i.e. between two or more different sound timbres or spectra corresponding to two or more different target electric guitars, but which were obtained at different positions of the volume potentiometer of such target electric guitar.

In fact, the variation of volume has the consequence of varying the sound timbre of the electrical stringed musical instrument, in particular of the electric guitar.

It is therefore possible, for the same target guitar, to acquire a plurality of profiles, each corresponding to a different position of the volume potentiometer.

In this case too, the conversion, i.e. the switching between the various sound timbres corresponding to the various volume levels, can be executed dynamically and in real time by the user during playing, for example by way of an expression pedal connected to the device 10 according to the invention, or by way of a knob included in the device 10 according to the invention.

In an embodiment of the invention, the device 10 for simulating a sound timbre, particularly for stringed electrical musical instruments, is configured to create a new target sound timbre to be simulated, in response to an input action by the user which is detected by graphical interface means comprised in the device 10.

Substantially, the user can define or "draw" a new target sound timbre to be simulated; more precisely, the user can define or "draw" a new characteristic spectrum or a new spectral transfer function to be applied, by way of the filtering means 50, to the electrical signal generated by the source electric guitar 15.

For example, the new sound timbre defined or "drawn" by the user can have low tones corresponding to a Gibson Les Paul, medium tones corresponding to a Fender Stratocaster, and high tones corresponding again to a Gibson Les Paul, or spectrum portions that do not exactly correspond to any of the two spectra but which are defined freely by tracing an alternative curve to the two curves that represent the profiles of the two guitars mentioned.

Figure 8:
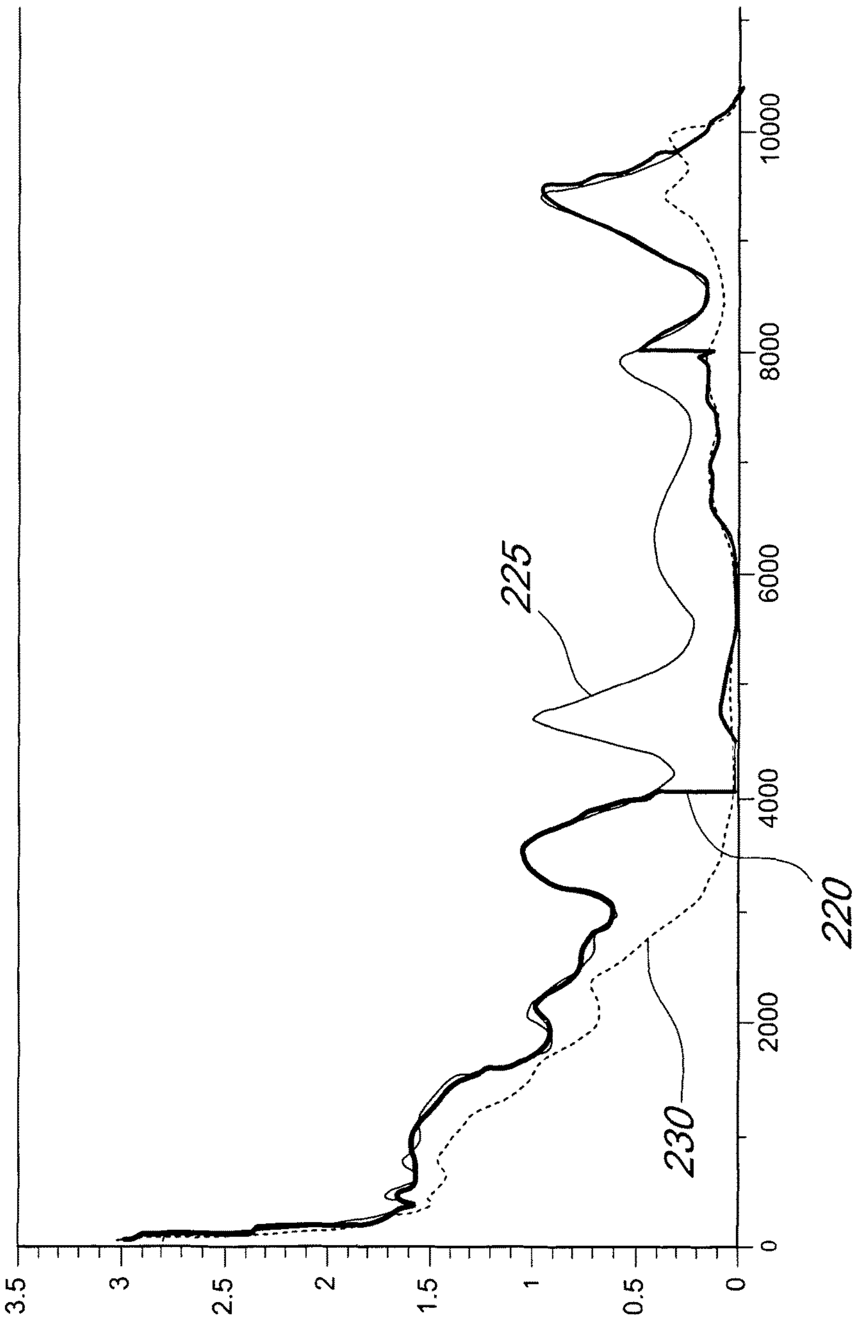
FIG. 8 is a graph showing a pair of spectral transfer functions for simulating a target electric guitar starting from a source electric guitar, and a third spectral transfer function freely redefined starting from such spectral transfer functions.

Taking FIG. 8 as an example, the spectral representation of the new transfer function 220 is obtained by mutually combining the initial portion, corresponding to low tones, of the spectral transfer function 225, the central portion, corresponding to medium tones, of the spectral transfer function. 230, and the end portion, corresponding to high tones, of the spectral transfer function 225; the transfer functions 225 and 230 being already known, in that they were previously calculated according to one of the methods described above, and substantially playing the role of maps or guides to assist with the definition or "drawing" of the user.

In an embodiment of the device 10 for simulating a sound timbre, particularly for stringed electrical musical instruments, according to the invention, the learning procedure can even be carried out without directly playing the target electric guitar, or more generally the target electrical stringed musical instrument, by supplying as input to the device 10, in particular to the input means 20, an audio recording, in any format, of the target electrical stringed musical instrument for which it is desired to define and store the sound profile.

In an alternative embodiment of the device 10, the learning procedure can be omitted entirely, and be substituted by the automatic loading into the memory 40 of preset sound profiles, corresponding to the most widely differing musical instruments, such as for example by loading files of sound profiles using storage devices such as USB drives or CD-ROMs.

The embodiments of the device for simulating a sound timbre, particularly for stringed electrical musical instruments, can be many and varied. For example, the device 10 according to the invention can be implemented inside a pedal board or a multi-effect rack for guitars (mainly for use when playing live), or within a amplifier for electrical or electrical/acoustic musical instruments, or directly on electric guitars, electric bass guitars or bowed instruments (for example a violin provided with pickups) in the electronic components integrated in the body of the musical instrument, or also by way of mobile devices, such as for example smartphones and tablet computers, provided with an adapted app and optionally connected to an external electronic card, or by way of a DAW (Digital Audio Workstation) plugin.

In the example embodiments cited above, and in any case in any other use case of the device for simulating a sound timbre, described and claimed herein, the electrical stringed musical instrument used can also comprise a hexaphonic pickup, which, in any event, is not strictly necessary for the correct operation of the device for simulating a sound timbre according to the invention.

In the various possible embodiments of the invention, the device 10 for simulating a sound timbre can also comprise accessory functionalities, such as for example the simulation of amplification combined with effects such as saturation, delay or reverb, a tuning function, pitch shift, and so on.

In practice it has been found that the invention fully achieves the set aim and objects. In particular, it has been seen that the device and the method for simulating a sound timbre, particularly for stringed electrical musical instruments, thus conceived make it possible to overcome the qualitative limitations of the known art, in that they make it possible to modify the sound timbre of a first, source electrical stringed musical instrument until it is made wholly identical to the sound timbre of a second, target electrical stringed musical instrument, for example any model of electric guitar, in order to simulate the musical timbre of another model of stringed musical instrument of the same type.

Another advantage of the device and of the method for simulating a sound timbre according to the invention consists in that they do not require a hexaphonic pickup, or even a dedicated stringed musical instrument, thus enabling the user to save the money that would be used to purchase such further component, or a new instrument, and the time necessary for assembly, and also avoid having to provide an adapted electric power supply for the electronic components inside the electrical stringed musical instrument.

Another advantage of the device and of the method for simulating a sound timbre according to the invention consists in that they calculate, for each pair of stringed electrical musical instruments, for example for each pair constituted by a source electric guitar and a target electric guitar, the modifications to apply to the electrical signal of the first (source) stringed musical instrument in order to obtain the same sound timbre as the second (target) stringed musical instrument.

Furthermore, the device and the method for simulating a sound timbre according to the invention enable the user to record the sound, in particular the sound timbre, of his/her own stringed musical instrument, so that, if the strings age, it will be possible to simulate the original, lively sound timbre. Similarly, the device and the method for simulating a sound timbre according to the invention make it possible to simulate the sound timbre of a stringed musical instrument which is obtainable using thicker strings, but playing the same stringed musical instrument with thinner strings, so as to obtain, for example, a full-bodied sound timbre while avoiding the drawbacks of using the bending technique.

Note that the device and the method for simulating a sound timbre, particularly for stringed electrical musical instruments, according to the invention, not only make it possible to optimally simulate the sound timbre of a target electrical stringed musical instrument, in the case where the notes are played on the source instrument and on the target instrument using the same technique (for example with a plectrum) and with the same intensity, but they also make it possible to simulate the player's technique, in the case where the notes are played using different techniques and intensities between the source instrument and the target instrument.

For example, this enables the user who so wishes to play the source electrical stringed musical instrument using a plectrum, but obtaining an output sound corresponding to playing with the pizzicato technique, or to play "softly", but obtaining the typical tone of a forceful playing technique.

Also note that, differently from many solutions that are currently known, the device and the method for simulating a sound timbre, described and claimed herein, do not have any mathematical model for the identification and consequent processing of the position of the pickup of the electrical stringed musical instrument, be they of the monophonic type or of the hexaphonic type.

Although the device and the method for simulating a sound timbre according to the invention have been conceived in particular for use in combination with stringed electrical musical instruments, such as for example electric guitars or electric bass guitars, they can also be used, more generally, for simulating the sound timbre of musical instruments of many and varied types.

The invention, thus conceived, is susceptible of numerous modifications and variations, all of which are within the scope of the appended claims. Moreover, all the details may be substituted by other, technically equivalent elements.

In practice, the materials used, as well as the contingent shapes and dimensions, may be any according to requirements and to the state of the art.

In particular, the device according to the invention can also be provided by way of fixed processing devices, such as for example a personal computer, or mobile processing devices, such as for example a smartphone or a tablet computer, all of which already comprise input means, output means, memory means and a processor, implementing the filter via software.

In conclusion, the scope of protection of the claims shall not be limited by the explanations or by the preferred embodiments illustrated in the description by way of examples, but rather the claims shall comprise all the patentable characteristics of novelty that reside in the present invention, including all the characteristics that would be considered as equivalent by the person skilled in the art.

The content of Italian patent application no. MO2015A000080 (102015902343865), the priority of which is claimed in the present application, is incorporated as a reference.

The invention claimed is:

1. A device for simulating a sound timbre, particularly for stringed electrical musical instruments, which comprises an input for acquiring an electrical signal generated by a musical instrument, and a filter which operate on said electrical signal generated by a source musical instrument, wherein said filter applies to said electrical signal generated by said source musical instrument a transfer function obtained by correlating the sound profile of a target musical instrument to the sound profile of said source musical instrument, said sound profiles comprising respectively the average frequency spectrum of a range of notes played on said target musical instrument and the average frequency spectrum of a corresponding range of notes played on said source musical instrument, wherein said musical instrument comprises strings and said sound profiles are defined on the basis of said electrical signals generated by said musical instruments, corresponding to the playing of at least one note per string, covering at least one tenth of the range of extension of said musical instruments.

2. The device for simulating a sound timbre according to claim 1, wherein the device comprises a processor, the processor configured to require the playing of a preset sequence of notes in order to identify said sound profile of said source musical instrument.

3. The device for simulating a sound timbre according to claim 2, wherein said preset sequence of notes is the same sequence used by said processor to define said sound profile of said target musical instrument.

4. The device for simulating a sound timbre according to claim 2, wherein said processor is further configured to verify the correct playing of said preset sequence of notes.

5. The device for simulating a sound timbre according to claim 1, wherein said musical instrument comprises strings and said sound profiles are defined by playing an equal number of notes for each string.

6. The device for simulating a sound timbre according to claim 1, wherein said sound profiles are defined by playing notes belonging to a chromatic scale.

7. The device for simulating a sound timbre according to claim 1, wherein said average frequency spectrum is obtained by way of the average of the spectral envelopes of sounds of different pitch, of said notes.

8. The device for simulating a sound timbre according to claim 7, wherein said spectral envelopes are defined estimating the spectrum of the electrical signal by way of interpolation, cepstrum, mel-cepstrum, or LPC.

9. The device for simulating a sound timbre according to claim 1, wherein the device further comprises amplitude modulation means adapted to amplitude modulate said filtered electrical signal by applying gains calculated by way of a comparison between the amplitude envelope of said sound profile of said target musical instrument and the amplitude envelope of said sound profile of said source musical instrument.

10. The device for simulating a sound timbre according to claim 1, wherein said filter comprise a FIR filter coupled with the use of the partitioned convolution technique.

11. The device for simulating a sound timbre according to claim 1, wherein said target sound profile and/or said source sound profile and/or said transfer function are pre-calculated externally with respect to said device and loaded in a memory of said device.

12. The device for simulating a sound timbre according to claim 1, wherein the device is implemented by way of a personal computer.

13. The device for simulating a sound timbre according to claim 1, wherein the device is implemented by way of a smartphone or a tablet.

14. The device for simulating a sound timbre according to claim 1, wherein the device is implemented inside a pedal board or a multi-effect rack.

15. The device for simulating a sound timbre according to claim 1, wherein the device is implemented inside an amplifier.

16. The device for simulating a sound timbre according to claim 1, wherein the device is implemented in the electronic components integrated in the body of a musical instrument.

17. The device for simulating a sound timbre according to claim 1, wherein said input acquires said electrical signal from a polyphonic pickup.

18. The device for simulating a sound timbre according to claim 1, wherein said input acquires said electrical signal from a microphone.

19. The device for simulating a sound timbre according to claim 1, wherein the device is configured to execute the morphing between two or more target sound profiles to be simulated.

* * * * *